United States Patent [19]

McCoy

[11] Patent Number: 6,122,700
[45] Date of Patent: Sep. 19, 2000

[54] APPARATUS AND METHOD FOR REDUCING INTERRUPT DENSITY IN COMPUTER SYSTEMS BY STORING ONE OR MORE INTERRUPT EVENTS RECEIVED AT A FIRST DEVICE IN A MEMORY AND ISSUING AN INTERRUPT UPON OCCURRENCE OF A FIRST PREDEFINED EVENT

[75] Inventor: Dean Joseph McCoy, Vista, Calif.

[73] Assignee: NCR Corporation, Dayton, Ohio

[21] Appl. No.: 08/883,094

[22] Filed: Jun. 26, 1997

[51] Int. Cl.[7] ........................................ G06F 13/24
[52] U.S. Cl. ...................... 710/260; 710/48; 710/262; 710/263; 710/264
[58] Field of Search ........................ 395/733, 735, 395/736, 737, 738, 732, 860, 868; 710/260, 262, 263, 264, 265, 244, 40, 48

[56] References Cited

U.S. PATENT DOCUMENTS

| | | | |
|---|---|---|---|
| 3,866,181 | 2/1975 | Gayman et al. | 340/172.5 |
| 4,337,513 | 6/1982 | Furuhashi | 364/431.11 |
| 4,734,882 | 3/1988 | Romagosa | 395/737 |
| 5,369,768 | 11/1994 | Takano | 395/725 |
| 5,608,897 | 3/1997 | Claffey-Cohen | 395/557 |
| 5,650,933 | 7/1997 | Mazur et al. | 364/426.01 |

*Primary Examiner*—Ayaz R. Sheikh
*Assistant Examiner*—Ario Etienne
*Attorney, Agent, or Firm*—Gates & Cooper

[57] ABSTRACT

A method and apparatus for reducing interrupt density in a computer system. One or more interrupt events received at a first device are stored in a memory and an interrupt is issued from the first device to a second device attached to the first device upon an occurrence of a first predefined event, wherein the second device retrieves the stored interrupt events from the memory and processes the retrieved interrupt events in response to the issued interrupt. Thereafter, an interrupt is issued for every interrupt event from the first device to the second device after the occurrence of the first predefined event until an occurrence of a second predefined event. After the occurrence of the second predefined event, the interrupt events received at a first device are again stored in the memory without issuing an interrupt from the first device to the second device. Finally, an interrupt is issued from the first device to the second device upon another occurrence of the first predefined event. These alternating steps or elements storing and not storing interrupt events continues indefinitely.

10 Claims, 4 Drawing Sheets

APPARATUS AND METHOD FOR REDUCING INTERRUPT DENSITY IN COMPUTER SYSTEMS BY STORING ONE OR MORE INTERRUPT EVENTS RECEIVED AT A FIRST DEVICE IN A MEMORY AND ISSUING AN INTERRUPT UPON OCCURRENCE OF A FIRST PREDEFINED EVENT

BACKGROUND OF THE INVENTION

1. Field of the Invention

This invention relates in general to reducing interrupt density in computer systems, and in particular to reducing the frequency of interrupts received by central processing units from attached peripheral devices.

2. Description of Related Art

Some peripheral devices, such as high speed communications devices, can cause a large number of interrupts in a central processing unit (CPU) of a computer system. Thus, it may be desirable to add intelligence to the peripheral device, for example, so that it only interrupts the CPU after some number of interrupts have been received or a period of time has passed, thereby reducing the interrupt density. For example, an asynchronous transfer mode (ATM) communications link receiving 64-byte Protocol Data Units (PDUs) could potentially generate an interrupt about every 1.5 microseconds, or more than 650,000 interrupts per second. Hence, there is a need in the art for a method for reducing interrupt density in computer systems and thus eliminate the overhead normally associated with every interrupt event.

SUMMARY OF THE INVENTION

To overcome the limitations in the prior art described above, and to overcome other limitations that will become apparent upon reading and understanding the present specification, the present invention discloses a method and apparatus for reducing interrupt density in a computer system. One or more interrupt events received at a first device are stored in a memory and an interrupt is issued from the first device to a second device attached to the first device upon an occurrence of a first predefined event, wherein the second device retrieves the stored interrupt events from the memory and processes the retrieved interrupt events in response to the issued interrupt. Thereafter, an interrupt is issued for every interrupt event from the first device to the second device after the occurrence of the first predefined event until an occurrence of a second predefined event, wherein the second device retrieves the stored interrupt events from the memory and processes the retrieved interrupt events in response to the issued interrupts. After the occurrence of the second predefined event, the interrupt events received at a first device are again stored in the memory without issuing an interrupt from the first device to the second device. Finally, an interrupt is issued from the first device to the second device upon another occurrence of the first predefined event, wherein the second device retrieves the stored interrupt events and processes the retrieved interrupt events in response to the issued interrupts. These alternating steps or elements storing and not storing interrupt events continues indefinitely.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
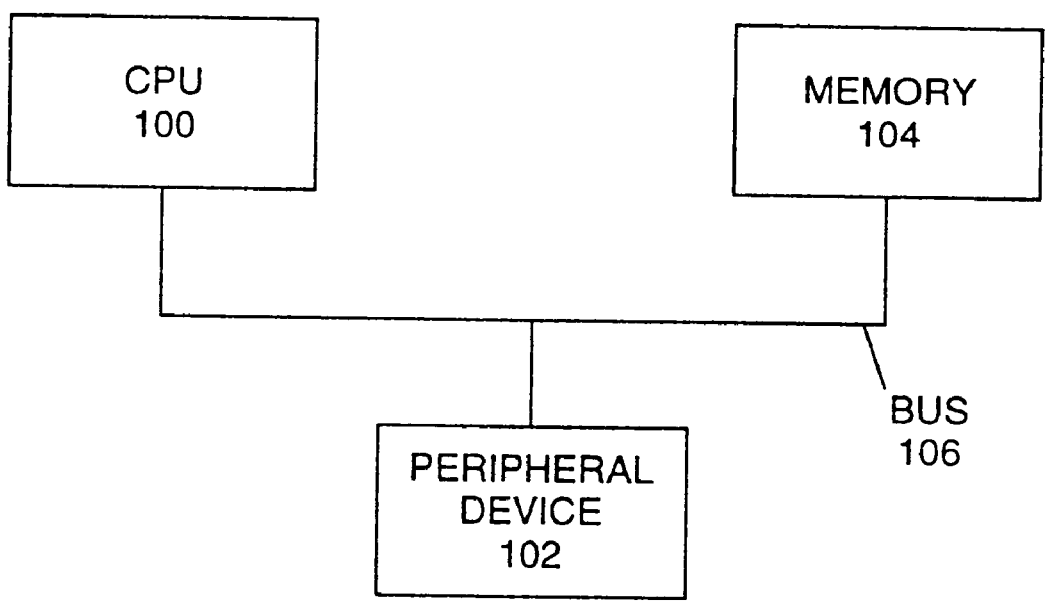
FIG. 1 is an exemplary block diagram of a computer system that includes, inter alia, a central processing unit (CPU), a peripheral device, and a memory subsystem.

FIG. 1 is an exemplary block diagram of a computer system that includes, inter alia, a central processing unit (CPU) 100, a peripheral device 102, and a memory subsystem 104. A system bus 106 interconnects all of these components. Of course, those skilled in the art will recognize that this example configuration is for illustration purposes only and is not intended to imply any specific architectural limits.

The peripheral device 102 includes programmable interrupt (INT) timer, wherein the timer can be programmed with a value for a specified time period. During normal operation, the peripheral device 102 would generate interrupts to the CPU 100 upon occurrence of the event. In the present invention, however, interrupt events are not sent from the communication device 102 to the CPU 100 during the INT timer period, unless a high priority interrupt event occurs. Instead, the interrupt events are enqueued or stored by the peripheral device 102 into the memory subsystem 104. The peripheral device 102 signals an interrupt to the CPU 100 only when the INT timer period expires or when a high priority interrupt event occurs. At that time, an interrupt is sent from the peripheral device 102 to the CPU 100, which in turn retrieves the enqueued interrupt events stored in the memory subsystem 104 for normal processing. The present invention thus controls the density or rate of interrupts sent to the CPU 100 by storing or buffering multiple interrupt events based on some specified criteria, such as a period of time, before the peripheral device 102 sends the interrupt events to the CPU 100. Generally, the criteria must be selected so that the memory storing the interrupt events does not overflow. In this manner, the interrupt density to the CPU 100 can be reduced significantly.

Interrupt Event Logic

Figure 2:
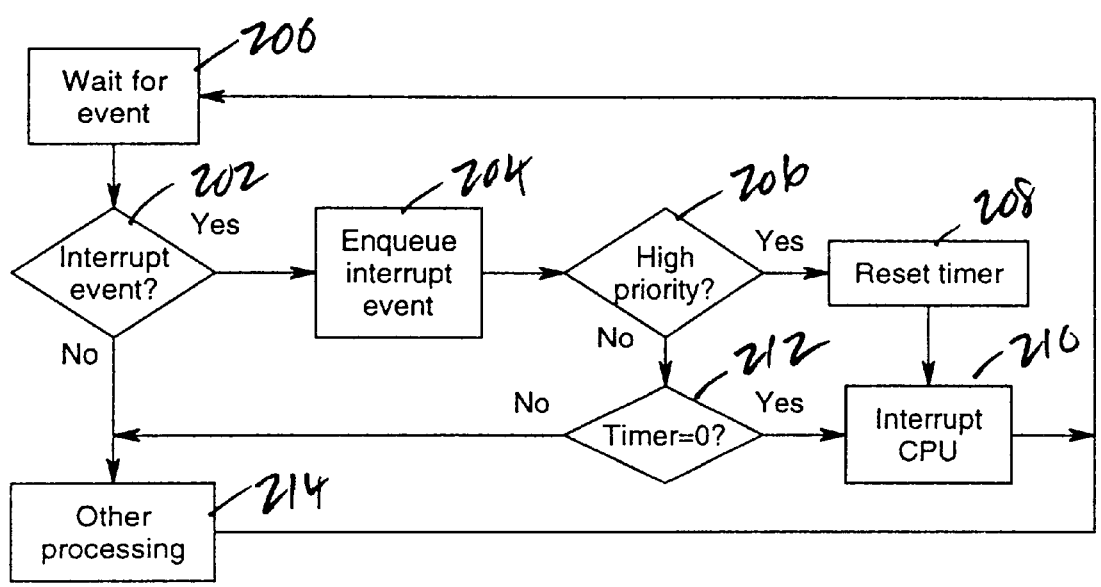
FIG. 2 is a flowchart illustrating the logic performed by the peripheral device according to the present invention.

FIG. 2 is a flowchart illustrating the logic performed by the peripheral device 102 in handling interrupt events according to the present invention. Block 200 represents the peripheral device 102 waiting for a next event, whereupon control is transferred to Block 202. Block 202 is a decision block that represents the peripheral device 102 determining whether the event was an interrupt event. If so, control transfers to Block 204; otherwise, control transfers to Block 214. Block 204 represents the peripheral device 102 enqueuing the interrupt event into the memory subsystem 104. Block 206 is a decision block that represents the peripheral device 102 determining whether the interrupt event is a high priority interrupt event. If so, control transfers to Block 208; otherwise, control transfers to Block 212. Block 208 represents the peripheral device 102 resetting the TNT timer to zero. Block 210 represents the peripheral device 102 interrupting the CPU 100. Block 212 is a decision block that represents the peripheral device 102 determining whether the TNT timer is zero. If so, control transfers to Block 210; otherwise, control transfers to Block 214, which performs other processing.

Timer Logic

Figure 3:
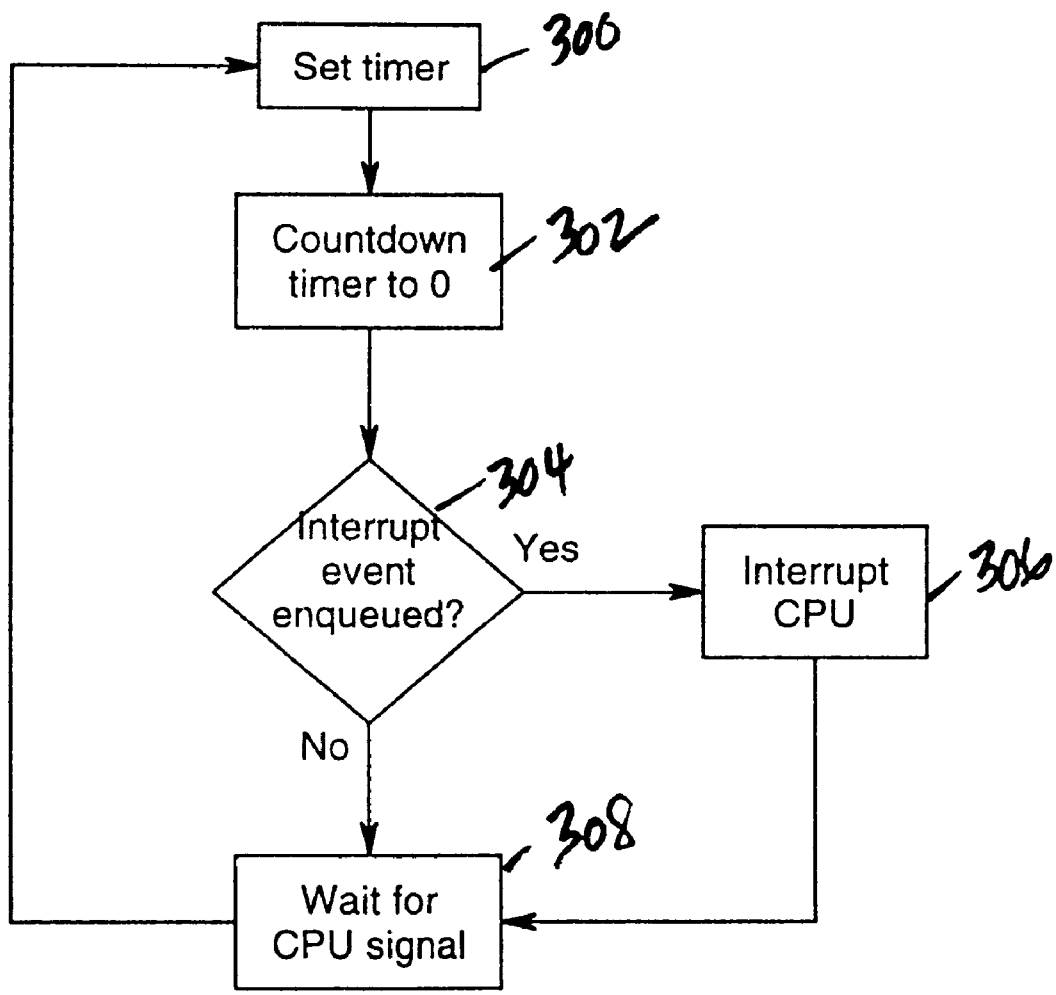
FIG. 3 is a flowchart illustrating the logic performed by the timer in the peripheral device according to the present invention.

FIG. 3 is a flowchart illustrating the logic performed by the peripheral device 102 in handling the timer according to the present invention. Block 300 represents the peripheral device 102 setting the TNT timer with a programmable value. Block 302 represents the TNT timer counting down to zero. Block 304 is a decision block that represents the peripheral device 102 determining whether any interrupt events are enqueued. If so, control transfers to Block 306 and then to Block 308; otherwise, control transfers to Block 308. Block 306 represents the peripheral device interrupting the CPU 100. Block 308 represents the peripheral device 102 waiting for a signal from the CPU 100. Finally, control transfers back to Block 300 to set the INT timer again.

CPU Logic

Figure 4:
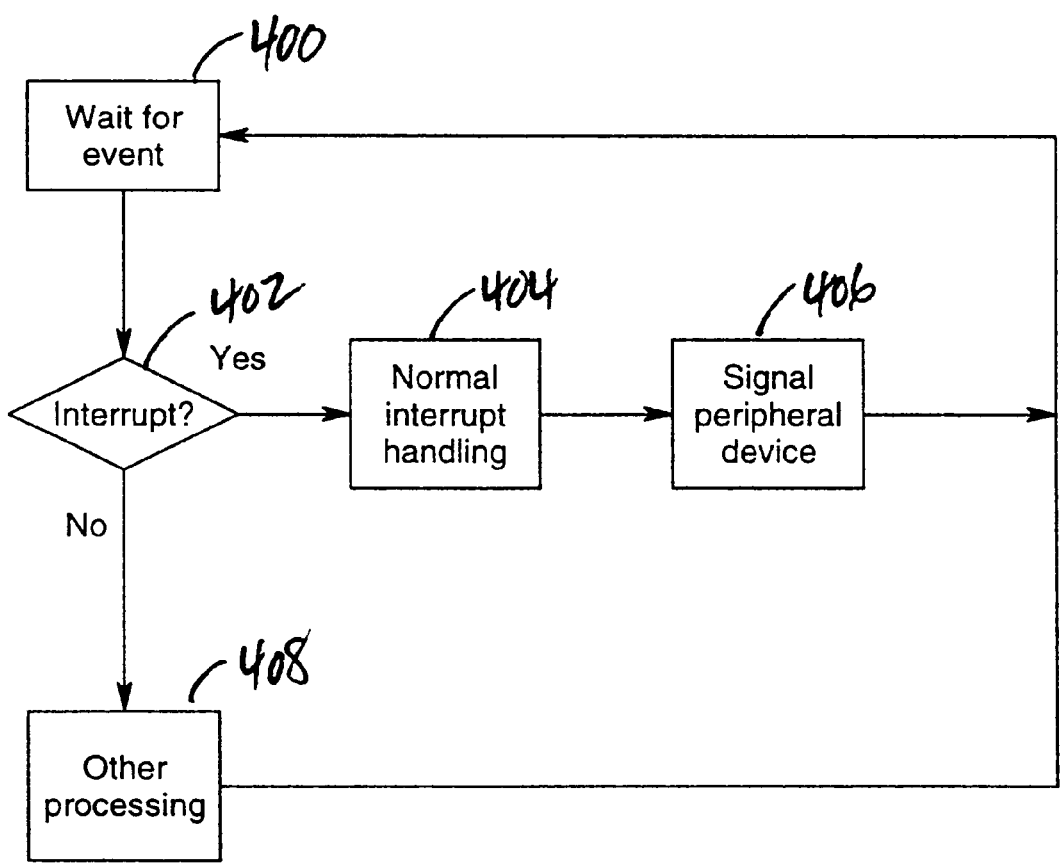
FIG. 4 is a flowchart illustrating the logic performed by the CPU according to the present invention.

FIG. 4 is a flowchart illustrating the logic performed by the CPU 100 according to the present invention. Block 400 represents the CPU 100 waiting for a next event, whereupon control is transferred to Block 402. Block 402 is a decision block that represents the CPU 100 determining whether the event was an interrupt. If so, control transfers to Block 404; otherwise, control transfers to Block 408. Block 404 represents the CPU 100 handling the interrupt by dequeuing all enqueued or stored interrupt events from the memory subsystem 104. Block 406 represents the CPU 100 signaling the peripheral device 102 upon its completion. Block 406 represents the CPU 100 performing other processing for other events.

Conclusion

In summary, the present invention discloses a method and apparatus for reducing interrupt density in a computer system. One or more interrupt events received at a first device are stored in a memory and an interrupt is issued from the first device to a second device attached to the first device upon an occurrence of a first predefined event, wherein the second device retrieves the stored interrupt events and processes the retrieved interrupt events in response to the issued interrupt. Thereafter, an interrupt is issued for every interrupt event from the first device to the second device after the occurrence of the first predefined event until an occurrence of a second predefined event, wherein the second device retrieves the stored interrupt events and processes the retrieved interrupt events in response to the issued interrupt.

After the occurrence of the second predefined event, the interrupt events received at a first device are again stored without issuing an interrupt from the first device to the second device. Finally, an interrupt is issued from the first device to the second device upon another occurrence of the first predefined event, wherein the second device retrieves the stored interrupt events and processes the retrieved interrupt events in response to the issued interrupt. These alternating steps or elements of storing and not storing interrupt events continues indefinitely.

In the present invention, the first and the second devices each may be a processor or a peripheral device. In other words, a peripheral device may store interrupt events destined for a processor or a processor may store interrupt events destined for a peripheral device. Further, the interrupt events may be stored in the peripheral device's memory, the processor's memory, or a separate memory subsystem.

In the preferred embodiment, the first predefined event comprises expiration of a time period and the second predefined event comprises a signal from one of the devices. Further, the first predefined event also comprises a high priority interrupt event. However, those skilled in the art will recognize that any number of different predefined events may also be used, such as the receipt of a predefined number of interrupt events, the processing of a predefined number of interrupt events, the anticipation or actual occurrence of a full memory for storing interrupt events, etc.

In conclusion, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for reducing interrupt density between devices, comprising the steps of:
   (a) storing one or more interrupt events received at a first device in a memory; and
   (b) issuing an interrupt from the first device to a second device attached to the first device upon an occurrence of a first predefined event, wherein the second device retrieves the stored interrupt events from the memory and processes the retrieved interrupt events in response to the issued interrupts;
   (c) issuing an interrupt for every interrupt event from the first device to the second device after the occurrence of the first predefined event until an occurrence of a second predefined event, wherein the second device retrieves the stored interrupt events and processes the retrieved interrupt events in response to the issued interrupt;
   (d) storing a plurality of interrupt events received at a first device in the memory without issuing an interrupt from the first device to the second device after the occurrence of the second predefined event; and
   (e) issuing an interrupt from the first device to the second device upon another occurrence of the first predefined event, wherein the second device retrieves the stored interrupt events from the memory and processes the retrieved interrupt events in response to the issued interrupt.

2. The method of claim 1 above, wherein the first and the second devices each may be selected from a group comprising a processor and a peripheral device.

3. The method of claim 1 above, wherein the first predefined event comprises an expiration of a time period.

4. The method of claim 1 above, wherein the first predefined event comprises a high priority interrupt event.

5. The method of claim 1 above, wherein the memory is selected from a group comprising: a peripheral device memory, a memory subsystem, and a processor memory.

6. An apparatus for reducing interrupt density between devices, comprising:
   (a) means for storing one or more interrupt events received at a first device in a memory; and
   (b) means for issuing an interrupt to a second device attached to the first device on an occurrence of a first predefined event, wherein the second device retrieves the stored interrupt events from the memory and processes the retrieved interrupt events in response to the issued interrupts;

(c) means for issuing an interrupt for every interrupt event from the first device to the second device after the occurrence of the first predefined event until an occurrence of a second predefined event, wherein the second device retrieves the stored interrupt events and processes the retrieved interrupt events in response to the issued interrupt;

(d) means for storing a plurality of interrupt events received at a first device in the memory without issuing an interrupt from the first device to the second device after the occurrence of the second predefined event; and (e) means for issuing an interrupt from the first device to the second device upon another occurrence of the first predefined event, wherein the second device retrieves the stored interrupt events from the memory and processes the retrieved interrupt events in response to the issued interrupt.

7. The apparatus of claim 6 above, wherein the first and the second devices each may be selected from a group comprising a processor and a peripheral device.

8. The apparatus of claim 6 above, wherein the first predefined event comprises an expiration of a time period.

9. The apparatus of claim 6 above, wherein the first predefined event comprises a high priority interrupt event.

10. The apparatus of claim 6 above, wherein the memory is selected from a group comprising: a peripheral device memory, a memory subsystem, and a processor memory.

\* \* \* \* \*